US010780662B2

(12) United States Patent
Coel et al.

(10) Patent No.: US 10,780,662 B2
(45) Date of Patent: Sep. 22, 2020

(54) AUTOMATIC TIRE SIPE MACHINE

(71) Applicant: 5 POINT FABRICATION, LLC, Green Bay, WI (US)

(72) Inventors: Michael J. Coel, Green Bay, WI (US); Roman Mudry, Green Bay, WI (US)

(73) Assignee: 5 POINT FABRICATION, LLC, Green Bay, WI (US)

(*) Notice: Subject to any disclaimer, the term of this patent is extended or adjusted under 35 U.S.C. 154(b) by 198 days.

(21) Appl. No.: 16/047,477

(22) Filed: Jul. 27, 2018

(65) Prior Publication Data

US 2019/0061296 A1 Feb. 28, 2019

Related U.S. Application Data

(60) Provisional application No. 62/537,718, filed on Jul. 27, 2017.

(51) Int. Cl.
*B29D 30/68* (2006.01)

(52) U.S. Cl.
CPC .................... *B29D 30/68* (2013.01)

(58) Field of Classification Search
CPC ................... B29D 30/68; B26D 3/06
See application file for complete search history.

(56) References Cited

U.S. PATENT DOCUMENTS

| 4,144,923 | A | * | 3/1979 | Curry | B29D 30/68 157/13 |
| 4,250,940 | A | * | 2/1981 | Curry | B29D 30/68 157/13 |
| 4,306,607 | A | * | 12/1981 | Curry | B29D 30/68 157/13 |
| 4,609,026 | A | * | 9/1986 | Kondoh | B29D 30/68 157/13 |
| 4,683,931 | A | * | 8/1987 | Matteuzzi | B29D 30/68 157/13 |

* cited by examiner

*Primary Examiner* — David B. Thomas
(74) *Attorney, Agent, or Firm* — von Briesen & Roper, s.c

(57) ABSTRACT

An automatic tire sipe forming machine for forming sipes of uniform depths and at uniform intervals across the circumferential surface of a tire. The automatic tire sipe forming machine includes means for indexing a tire a fixed rotational interval and a reciprocating mechanism for forming the sipes. The automatic tire sipe forming machine further includes means for changing the angle of the sipes and for accommodating various widths and sizes of tires.

15 Claims, 10 Drawing Sheets

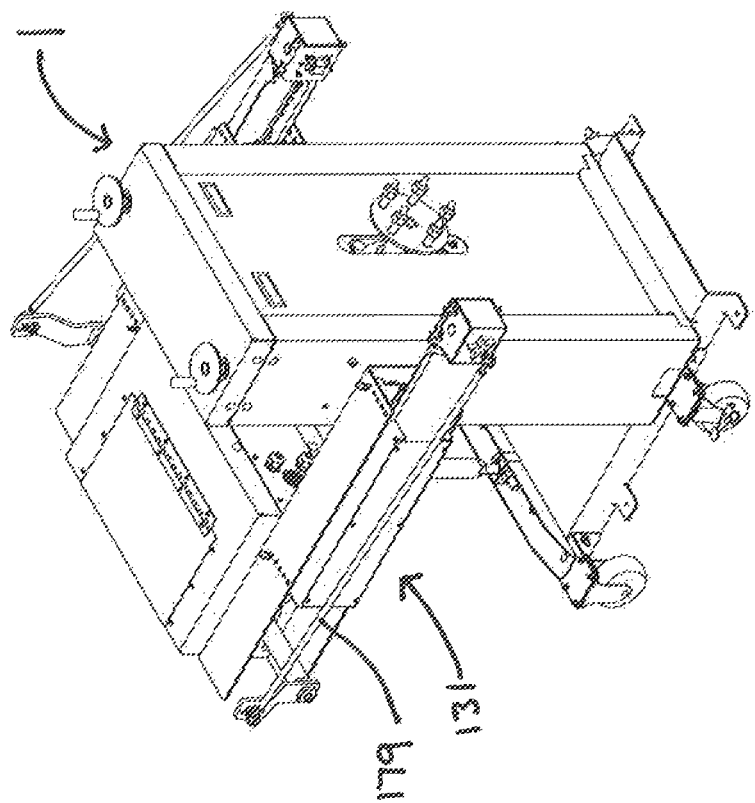
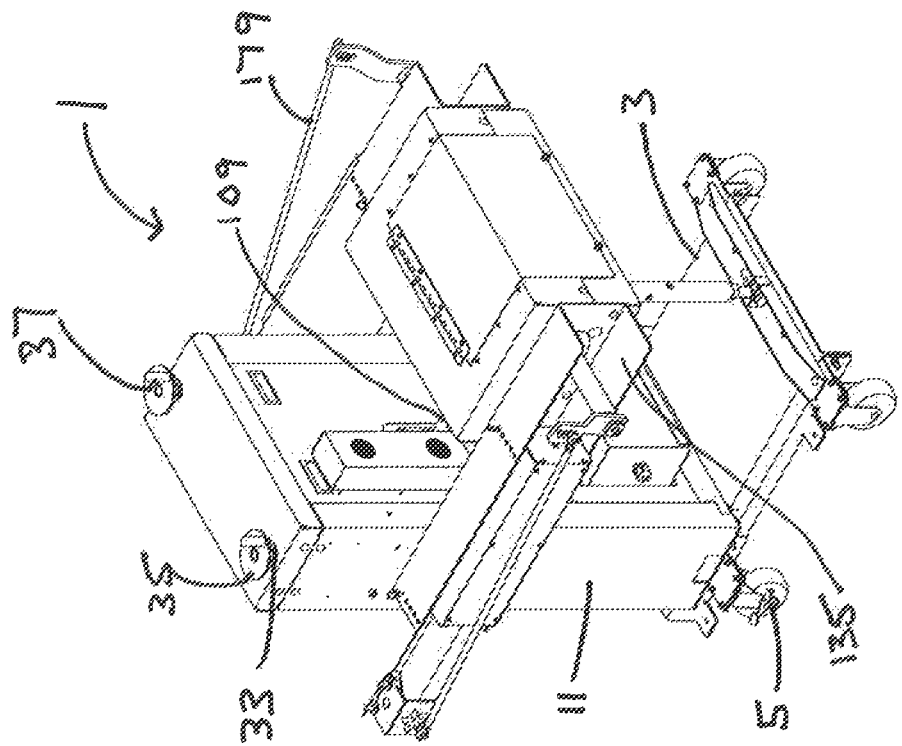
FIG. 1B
FIG. 1A

AUTOMATIC TIRE SIPE MACHINE

FIELD OF THE INVENTION

The present invention generally relates to an automatic sipe forming machine for forming sipes on the tread face of a new tire or a retreaded tire for the purpose of improving traction and skid resistance.

BACKGROUND OF THE INVENTION

Conventional tire siping methods have been manual. Specifically, an operator manually forms grooves on a tread face to a predetermined depth using a knife or knives arranged in a parallel holder. This known process is extremely undesirable in that it is a manual operation that requires several hours and a significant amount of strength and precision to cut consistent sipes on the tread face of a single tire. Moreover, the manual tire siping operation itself is dangerous in that an operator is required to make repetitive applications of an extremely sharp knife over a relatively hard surface. Additionally, non-uniformities or irregularities of pitch, depth, angle and shape of the sipes are likely to occur, resulting in less effective tire sipes.

SUMMARY OF THE INVENTION

Accordingly, the claimed automatic sipe forming machine is operable to cut sipes on a circumferential tread face of a tire. The claimed automatic sipe machine is simple in structure and low in manufacturing cost and provides the ability to adjust the angles of the sipe, and accommodate a wide range of tire sizes, both circumferential sizes and tire widths. The claimed automatic tire siping machine is also capable of accommodating wheel offsets.

In accomplishing these and other objects according to one preferred embodiment of the present invention, there is provided an improved automatic sipe forming machine for forming sipes on a tread face of a tire, comprising a tire supporting apparatus and a sipe forming apparatus. In accordance with the invention, it is possible to adjust the pitches, angles, depths and shapes of the sipes.

BRIEF DESCRIPTION OF THE DRAWINGS

FIG. 1A is a top and left side perspective view of the automatic tire siping machine.

FIG. 1B is a top and right side perspective view of the automatic tire siping machine.

DETAILED DESCRIPTION OF THE INVENTION

Figure 3:
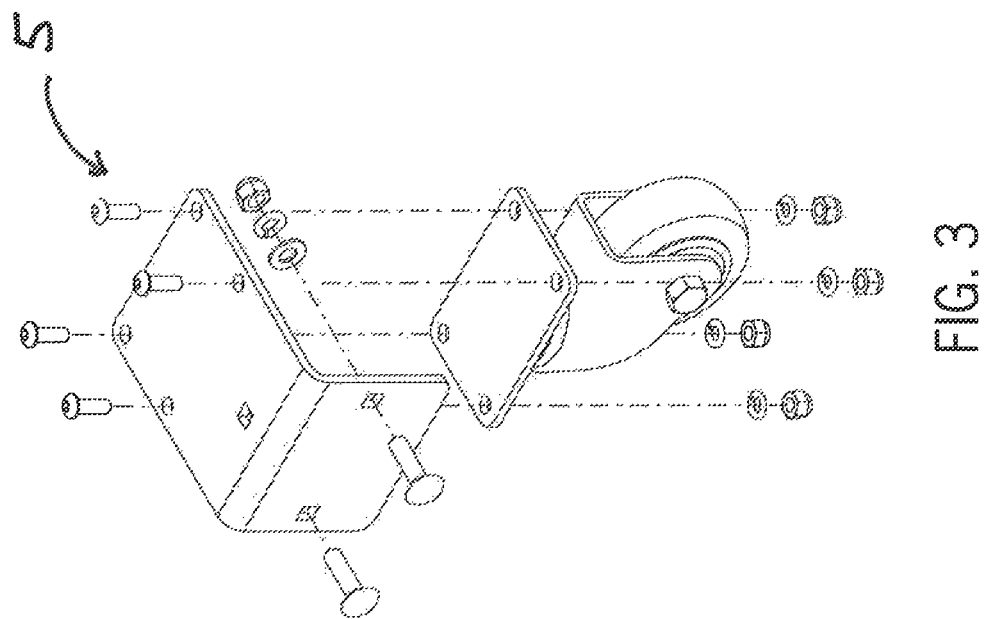
FIG. 3 shows a caster assembly for use with the automatic tire siping machine.

Now referring to the drawings in detail wherein like reference numerals refer to elements throughout, FIGS. 1A and 1B show assembly views of the automatic tire siping machine 1.

Figure 2:
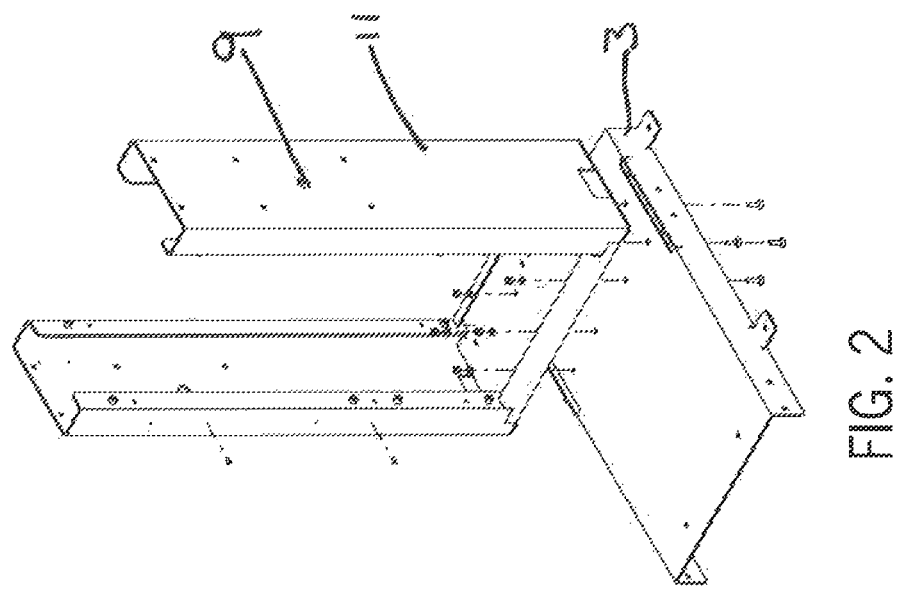
FIG. 2 shows a top and side perspective view of the chassis and upright members of the chassis.
Figure 4:
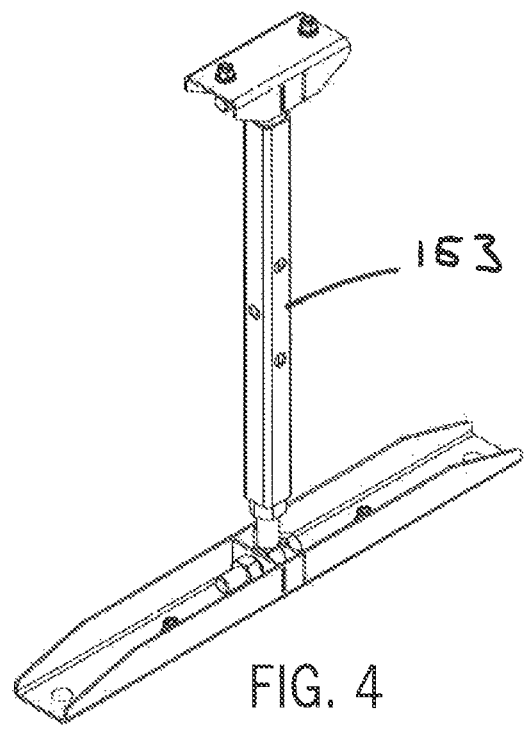
FIG. 4 shows a turnbuckle assembly used to raise and lower the crank arm assembly to change the angle of the Sipes created by the machine.
Figure 5:
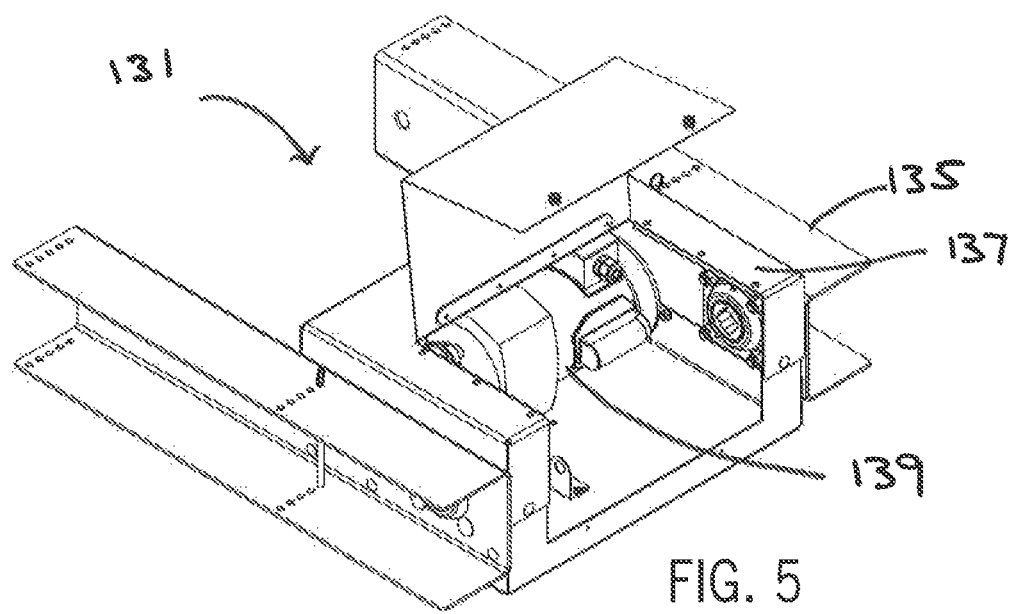
FIG. 5 shows the chassis subassembly for the crank arm assembly and motor.
Figure 6:
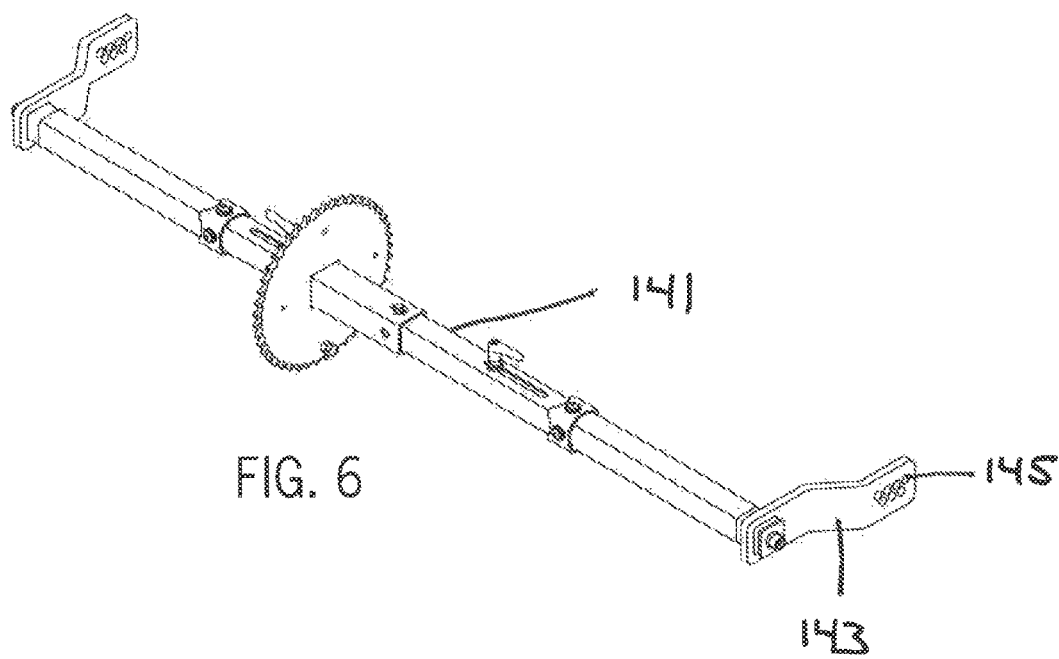
FIG. 6 shows the crank arm assembly.

Referring now to FIG. 2, support structure for automatic siping machine 1 comprises chassis 3 and vertical support members 11 shown in more detail in FIG. 2. Chassis 3 is designed to be relatively mobile and generally provides accommodation slots 7 for the forks of a forklift such that automatic siping machine 1 can be easily moved. Chassis 3 may also include casters 5 such as those shown in FIG. 5 such that automatic siping machine 1 can be wheeled around manually. Chassis 3 further includes complementary apertures 9 on either side for use in connection with side channels 135 which help support motor carriage assembly 137, which is discussed in more detail below. Vertical support members 11 are rigidly attached to chassis 3 and are designed to provide fixed support for the carriage height adjustment assembly 21 (discussed in more detail below), which is used to raise and lower the carriage assembly 51.

Figures 7A, 7B:
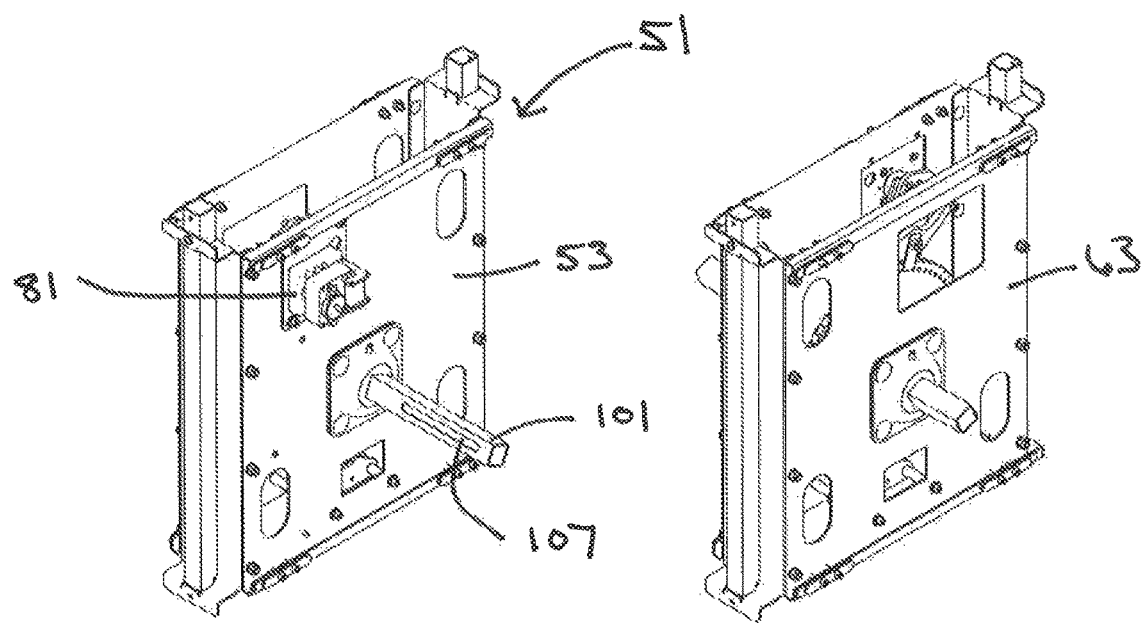
FIG. 7A shows a top, front and side view of the carriage indexing assembly.
FIG. 7B shows a top, back and side view of the carriage indexing assembly.
Figure 8:
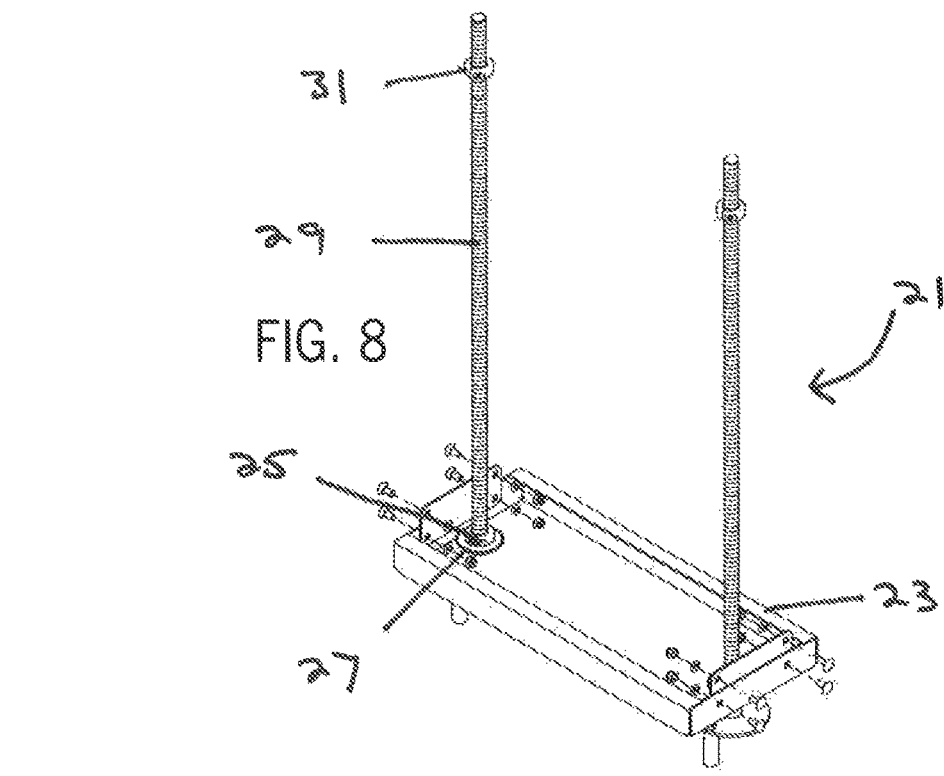
FIG. 8 shows a top and bottom view of the carriage height adjustment assembly.
Figure 10:
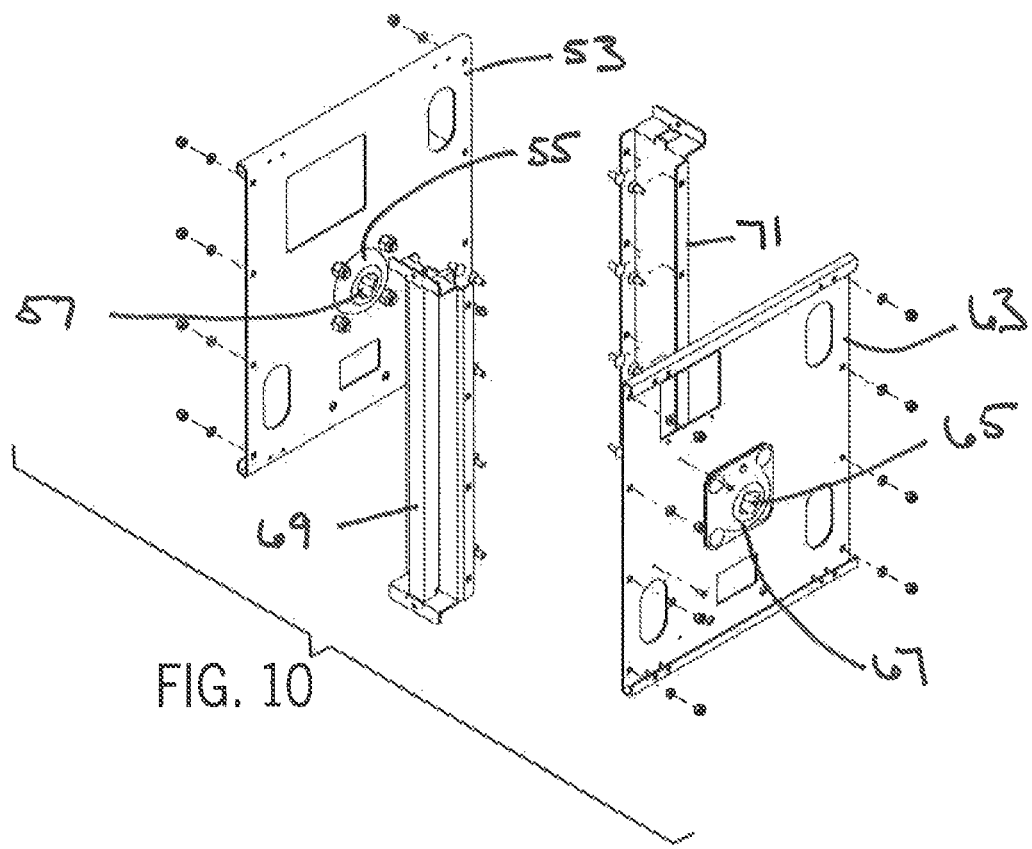
FIG. 10 shows a top and side perspective and exploded view of the carriage assembly.
Figure 11:
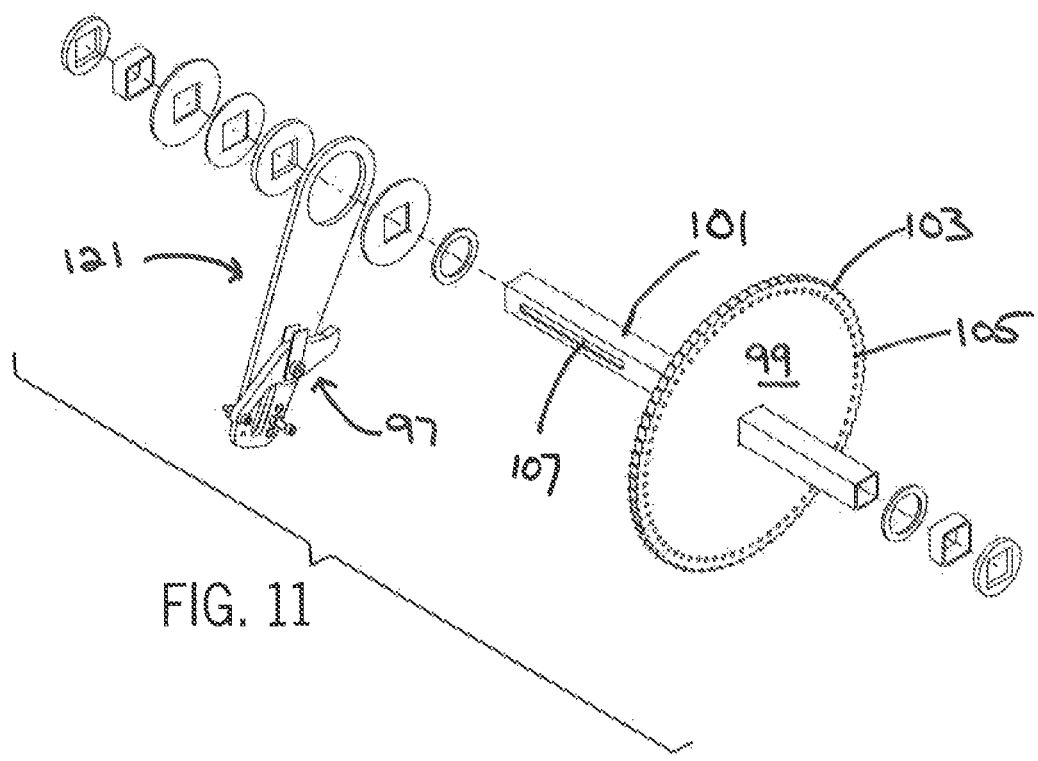
FIG. 11 shows an exploded view of the rocker arm subassembly used with the ratcheting indexing assembly.

Referring now to FIG. 8, carriage height adjustment assembly 21 provides structural support and height adjustment for the carriage assembly 51 shown in FIGS. 7A, 7B and 10. Carriage height adjustment assembly 21 comprises cover plate 23 situated across the vertical support members 11 and affixed to the vertical support members 11. Cover plate 23 comprises a pair of apertures 25 through which bearings 27 are mounted. ACME screws 29 comprising a lower collar 31 are inserted through bearings 27 such that they protrude through cover plate 23 and can be secured using an upper collar 33 and crank disc 35 fixed to ACME screw. Handle 37 attached to crank disc 35 is used to rotate crank disc 35. ACME screws 29 are inserted through apertures 9 in chassis 3 up to lower collar 31. A sprocket 39 is fixed to each ACME screw 29. Sprockets 39 are connected via chain 41 such that rotation of one ACME screw 29 causes rotation of both ACME screws 29 and vertical movement of the carriage assembly 51. Carriage height adjustment assembly permits additional angular adjustment of the siping assembly 131.

Figure 9:
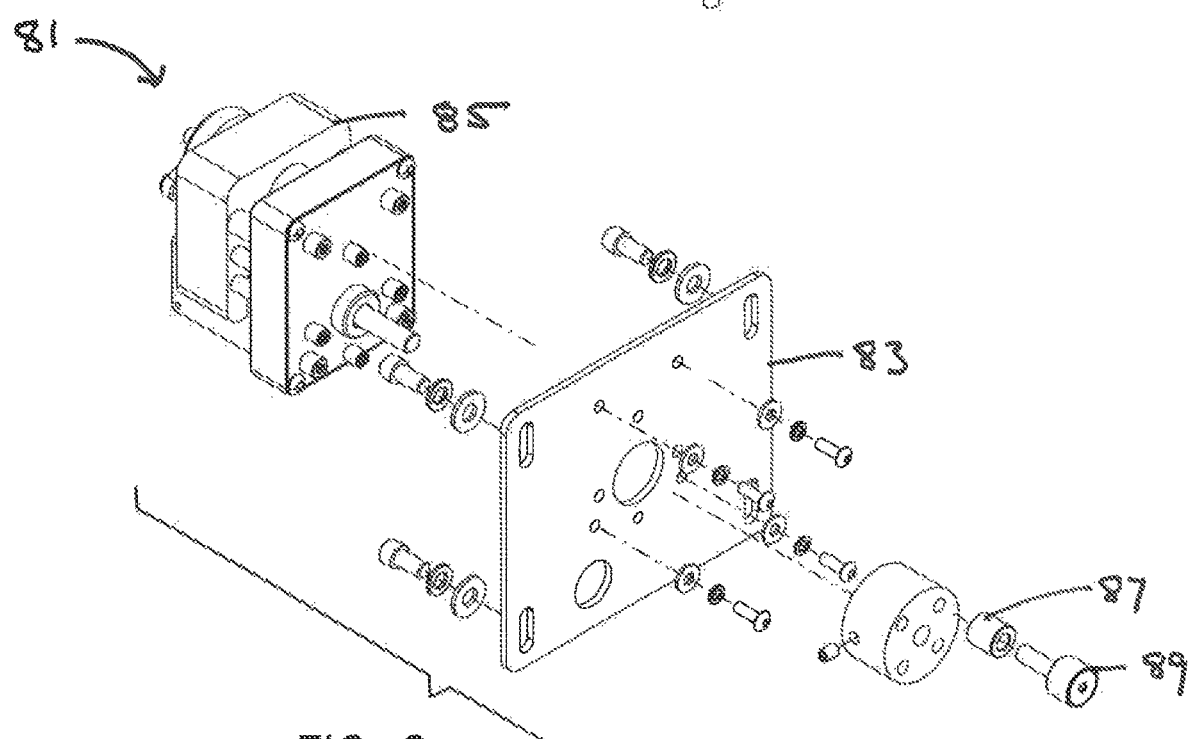
FIG. 9 shows top, side and frontal view of the indexing motor assembly.

Referring now to FIG. 9, which shows indexing motor assembly 81 in detail, indexing assembly 81 is used to rotate a tire to be siped in increments. Indexing assembly 81 comprises a motor plate 83 and a gear motor 85 mounted to one side of motor plate 83. Gear motor 85 drives crank arm 87 located on opposite side of motor plate 83. Crank arm 87 comprises stud 89 used to drive rocker arm 123, which is discussed in more detail below.

Carriage assembly 51 is shown in more detail in FIGS. 7A and 7B and is located within vertical support members 11 and is operable to move vertically using carriage height adjustment assembly 21. As shown in FIGS. 7A and 7B, carriage assembly 51 comprises a back assembly carriage plate 53 comprising a central aperture 55 through which ball bearing assembly 57 is secured. Indexing assembly 81 is secured to back carriage plate 53. Front assembly carriage plate 63 comprises a central aperture 65 through which ball bearing assembly 67 is mounted. Front assembly carriage plate 63 is rigidly attached to back assembly carriage plate 73 via side rails 69 and 71 on both sides.

Figure 12A:
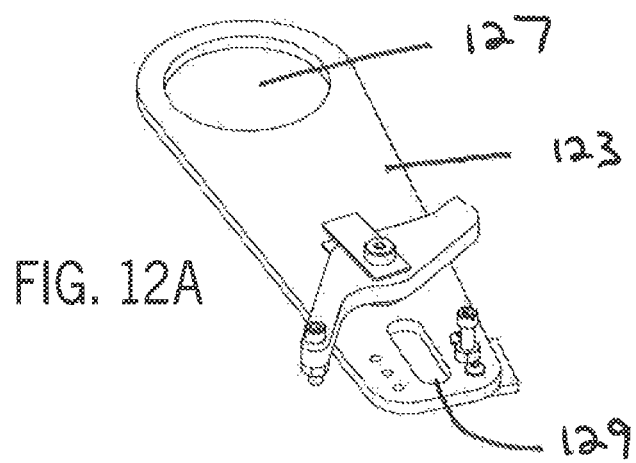
FIG. 12A shows a detailed top and side perspective view of the ratchet arm assembly.
Figure 12B:
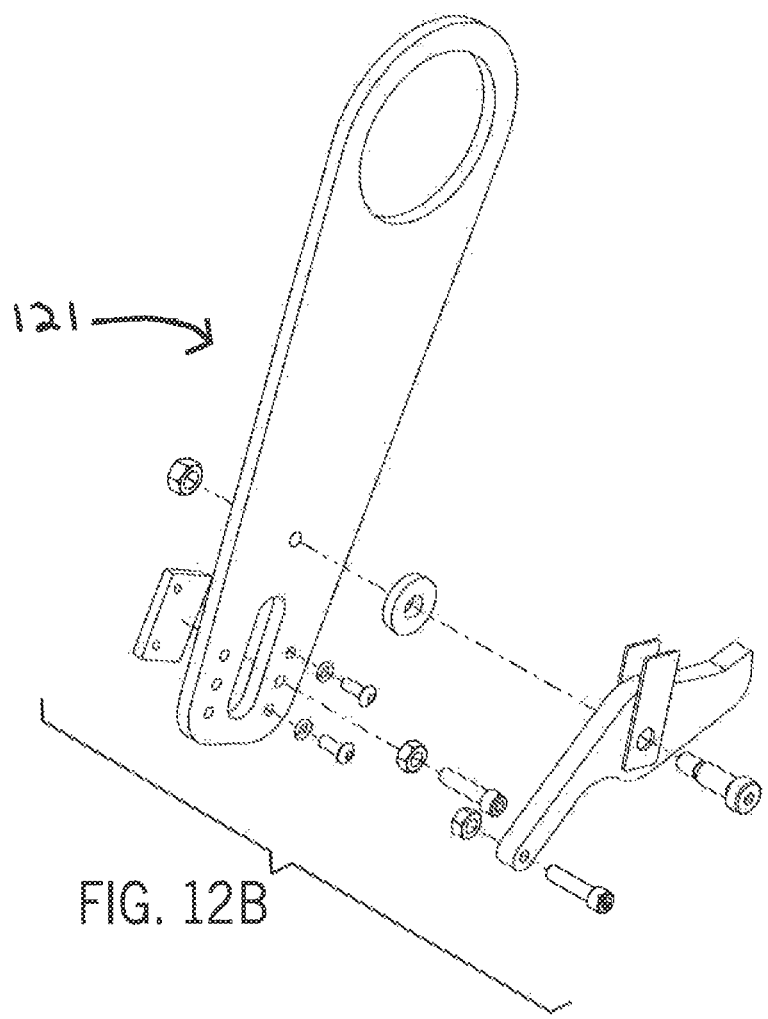
FIG. 12B shows an exploded view of the ratchet arm assembly shows the ratchet arm and ratcheting index assembly used with the automatic siping machine.

Referring now to FIGS. 12A and 12B, which show an exploded view of the rocker arm subassembly 121 and ratchet sub assembly 97 used to rotate the tire to be siped. The ratchet subassembly 97 is located between the front assembly carriage plate 63 and the back assembly plate carriage 53 and comprises a sprocket weldment 99 fixedly attached to driveshaft 101. Driveshaft 101 is mounted between ball bearing assembly 67 in back assembly carriage plate 63 and ball bearing assembly 67 in front carriage plate 83. Sprocket weldment 99 provides seventy-two (72) detents 103 such that each indexing of sprocket weldment 99 amounts to a rotation of five (5) degrees, although more or fewer detents 103 could be used. Sprocket weldment 99 further comprises seventy-two (72) locking apertures 105 such that when sprocket weldment 99 is indexed it can be locked into place by an indexing pin 111 as shown in FIG. 13

Figure 13:
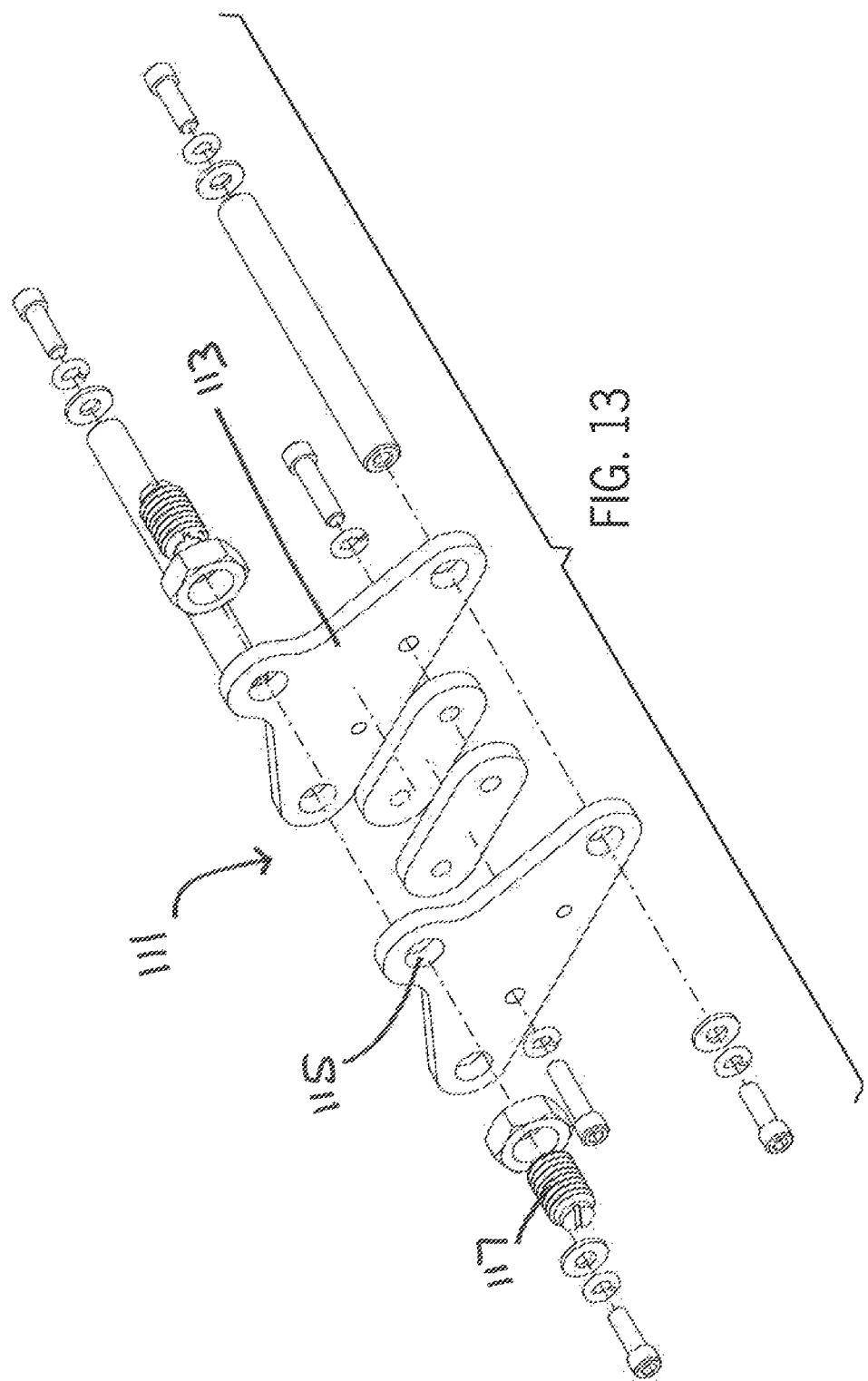
FIG. 13 show the indexing pin assembly used with the automatic siping machine.
Figure 14A:
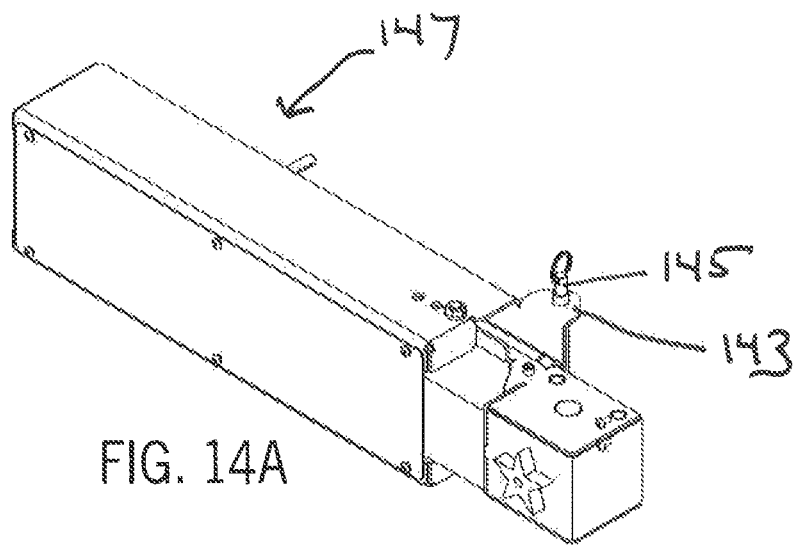
FIG. 14A is a top and side perspective view of the pivot arm in its retracted position
Figure 14B:
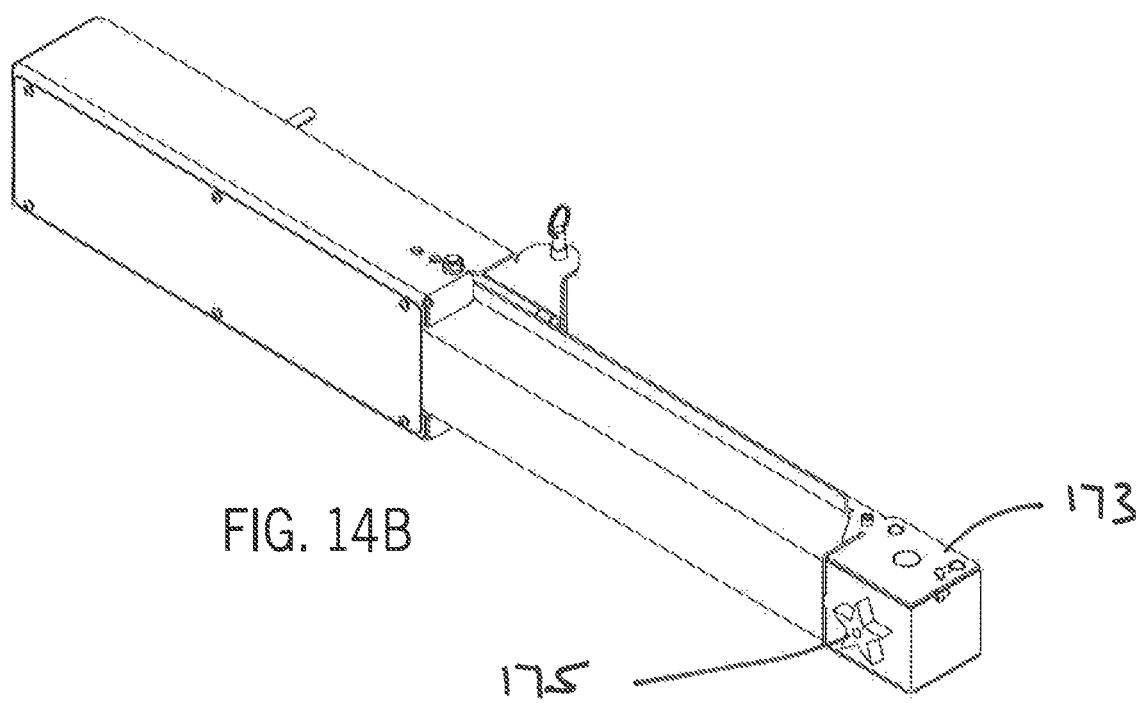
FIG. 14B is a top and side perspective view of the pivot arm in its extended position.
Figure 15:
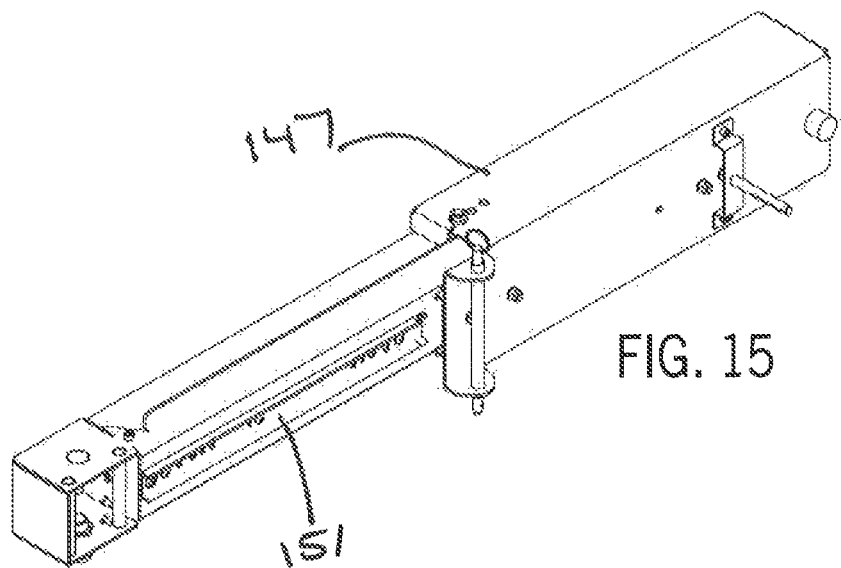
FIG. 15 is a top and side perspective view of the pivot arm in its extended position showing the drawer slide mechanism.
Figure 16:
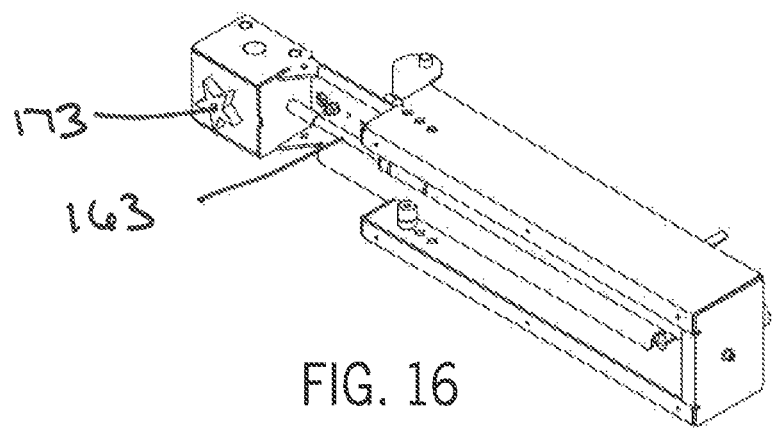
FIG. 16 is a top and side perspective view of the pivot arm in its retracted position showing the speed limiting mechanism.
Figure 17:
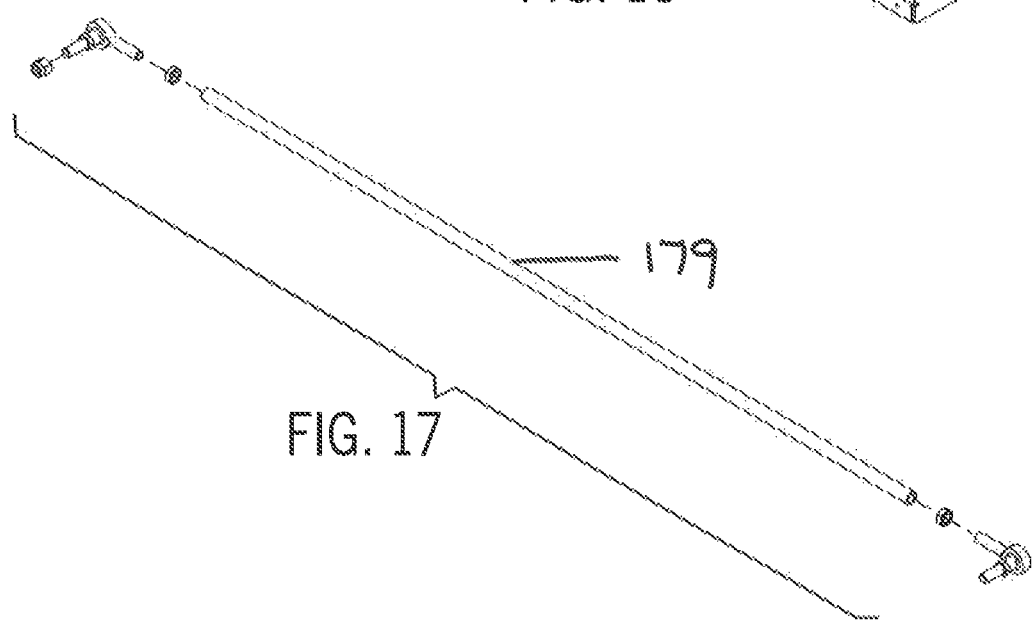
FIG. 17 shows the link assembly used to link the crank arm with the pivot arm assembly.

Referring now to FIG. 13, indexing pin assembly 111 is fixedly attached to back carriage plate 53 and front carriage plate 73 and comprises a triangular detent plate 113 having an aperture 115. Spring ball detent assembly 117 is fixedly attached to aperture 115. Ideally, a second triangular detent plate 113 comprising an aperture 115 and a spring ball detent assembly is affixed on the opposite side of the sprocket weldment 99 such that spring ball detents 117 are inserted into locking apertures 105 in sprocket weldment 99 to lock sprocket 99 in place.

Rocker arm subassembly 121 shown in FIGS. 12A and 12B employs the driveshaft 101 as a pivot point. Rocker arm sub assembly 121 is comprised of rocker arm 123 and pawl 125. Rocker arm 123 has a pivot end comprising an aperture 127 designed to accommodate the driveshaft 101 and that permits rocker arm 123 to pivot around driveshaft 101. Pivoting end of rocker arm 123 comprises a slot 129. Slot 129 is designed to accommodate stud 89 of crank arm 87. Pawl 125 is pivotally attached to rocker arm 123. When gear motor 85 is actuated to rotate crank arm 87, crank arm 87 moves to cause pawl 125 to contact detent 103 of sprocket weldment to index sprocket weldment 99. Once sprocket weldment 99 has been advanced one detent 103 and indexing pin assembly 111 actuates to insert spring ball detent 117 into aperture 105 of sprocket weldment 99. Actuation of crank arm 87 is sufficient to overcome indexing pin assembly 111 such that sprocket weldment 99 can be indexed to its next position. Gear motor 85 is indexed repeatedly in, for example five (5) degree increments until the tire has been completely Biped.

Wheel offset is extremely important to racing. Therefore, adjustability of the tire siping machine to accommodate various wheel offsets is required. As a result, driveshaft 101 is adjustable with respect to carriage assembly 51 such that drive shaft 101 protrudes through the front of the carriage assembly 51 either more or less to accommodate the wheel offset requirement. Driveshaft 101 provides a slot 107 and locking pin as detent ball assembly 109 to secure the drive shaft in a specific position relative to the carriage assembly 51.

Referring again to FIGS. 1A and 1B, siping assembly 131 comprises side channels 135 that are pivotally attached via pin 133 to vertical support members 11 at one end and support a motor carriage assembly 137 at the other end. Siping assembly 131 is supported by turnbuckle assembly shown in FIG. 5. Because it is pivotally attached to vertical support members 11 side channels 135, turnbuckle 153 is operable to raise and lower siping assembly 131 which operates to pivot siping assembly 131 relative to carriage assembly 51 thereby changing the sipe angle of the siping assembly 131. As shown in more detail in FIG. 5, siping assembly 131 further comprises an electric motor 139. Electric motor 139 is fixed to motor carriage assembly 137 and operable to rotate crank shaft 141, also rotatably fixed to motor carriage assembly 137 and actuated by electric motor 139. Crank shaft 141 further comprises a crank arm 37 on each end of the crank shaft 141. Crank arm 143 includes at least one mounting point 145 along the length of crank arm 143, but preferably includes several mounting points 145 for siping actuator rod 179. Multiple mounting points 145 allow adjustment for various tire widths.

Referring now to FIGS. 14A, 14B, 15 and 16, automatic siping machine 1 further comprises a pivoting arm assembly 147. Pivot arm 147 comprises hinge 143 which is attachable to side channels 135 via pin 145 such that pivot arm 141 is allowed to rotate about hinge 143.

Siper assembly 171 is attached to pivot arm 147 via drawer slide mechanism 151 or similar linear relative movement permitting mechanism. Siper assembly 171 is further attachable to siping actuator rod 179 such that siping actuator rod 179 advances siping assembly 171 across tire during forward stroke of crank arm 143. Upon completion of forward stroke by crank arm 87, siper assembly 171 is pulled away from tire such that siper assembly 171 and pivot arm 147 pivot away from tire while siper assembly 171 is retracted. A linear bearing assembly could also be used to attach siper assembly 171 to pivot arm 147 as well as other types of longitudinal movement assemblies. In both cases, arm structure may further comprise hydraulic unit damper/ speed control unit. 163. As shown in more detail in FIG. 16, hydraulic damper/speed limiter 163 is anchored to pivoting arm assembly 147 and siper assembly and is used to control speed of siper assembly 171. Siper assembly further comprises knife holder 173 and actuator rod attachment point 175. Siping assembly is designed to accommodate multiple blade tire siping knife 177.

Motion between indexing assembly and siping assembly is coordinated by logic controllers. Sensors in communication with the logic controllers are used to verify the mechanical position of the indexing mechanism so that the tire siping assembly can be actuated. Upon sensing completion of the tire siping step, logic controller permits and additional indexing step.

While the invention has been shown and described in terms of a specific embodiment, it is recognized that equivalents, alternatives, and modifications, aside from those expressly stated, are possible.

What is claimed is:

1. An automatic machine for creating sipes of uniform depths and at uniform intervals in the outer circumferential surface of a tire comprising:
   a support structure comprising a chassis and a pair of vertical support members;
   a tire and wheel support structure operable to secure the wheel and tire to the tire and wheel support structure and to prevent rotational and translational movement of the wheel and tire relative to the tire and wheel support structure;
   an indexing mechanism operable to intermittently rotate the tire and wheel support structure in increments affixed to the vertical support members;
   a siping blade mechanism comprising at least one siping blade; and
   a siping assembly comprising:
      a rotary mechanism operable to rotate a crank arm;
      a connecting rod comprising a first end attached to the siping blade mechanism and a second end attached to the crank arm;
      a pivot arm attached to one of the vertical support members such that it is permitted to pivot on an axis, the pivot arm further comprising a sliding assembly attached to the siping assembly, the pivot arm operable to pivot to apply the siping blade assembly to the outer circumferential surface of a tire when the connecting rod advances across the outer circumferential surface of the tire and to pivot the siping blade assembly away from the outer circumferential surface of the tire as the siping blade assembly is retracted across the tire.

2. The automatic machine for creating sipes of uniform depths and at uniform intervals of claim 1 wherein the crank arm further comprises a plurality of attachment points along its length thereby allowing for adjustment of the length of the stroke caused by rotation of the rotary mechanism.

3. The automatic machine for creating sipes of uniform depths and at uniform intervals of claim 1 further comprising a height adjustment mechanism attached to the vertical support members, the height adjustment mechanism being operable to raise and lower the indexing mechanism relative to the vertical support members.

4. The automatic machine for creating sipes of uniform depths and at uniform intervals of claim 1 further comprising a second siping mechanism and siping blade, the second siping mechanism operable simultaneously with the siping assembly to create a cross-hatched tire sipe pattern.

5. The automatic machine for creating sipes of uniform depths and at uniform intervals of claim 1 further comprising a height adjustment mechanism operable to raise or lower the siping assembly.

6. The automatic machine for creating sipes of uniform depths and at uniform intervals of claim 1 wherein the length of the connecting rod is adjustable.

7. The automatic machine for creating sipes of uniform depths and at uniform intervals of claim 1 wherein the siping blade mechanism is heated.

8. The automatic machine for creating sipes of uniform depths and at uniform intervals of claim 1 wherein the tire and wheel support structure is adjustable to accommodate various wheel offsets.

9. An automatic machine for creating sipes of uniform depths and at uniform intervals in the outer circumferential surface of a tire comprising:
   a support structure comprising a chassis and a pair of vertical support members;
   a tire and wheel support structure operable to secure the wheel and tire to the tire and wheel support structure and to prevent rotational and translational movement of the wheel and tire relative to the tire and wheel support structure;
   an indexing mechanism operable to intermittently rotate the tire and wheel support structure in increments, the indexing mechanism being attached to the vertical support members;
   a siping blade mechanism comprising at least one siping blade; and
   a siping assembly comprising:
      a rotary mechanism operable to rotate a shaft, the shaft further comprising a crank arm at each end;
      a pair of connecting rods each comprising a first end attached to a siping blade mechanism and a second end attached to one of the crank arms;
      a pair of pivot arms, with one of said pivot arms attached to each of the vertical support members such that each pivot arm is permitted to pivot on an axis, each pivot arm further comprising a sliding assembly attached to the siping assembly, the pivot arm operable to pivot to apply the siping assembly to the outer circumferential surface of a tire when the connecting rod advances across the outer circumferential surface of the tire and to pivot the siping assembly away from the outer circumferential surface of the tire as the siping assembly is retracted across the tire.

10. The automatic machine for creating sipes of uniform depths and at uniform intervals of claim 9 wherein the crank arm further comprises a plurality of attachment points along its length thereby allowing for adjustment of the length of the stroke caused by rotation of the rotary mechanism.

11. The automatic machine for creating sipes of uniform depths and at uniform intervals of claim 9 further comprising a height adjustment mechanism attached to the vertical support members, the height adjustment mechanism being operable to raise and lower the indexing mechanism relative to the vertical support members.

12. The automatic machine for creating sipes of uniform depths and at uniform intervals of claim 9 further comprising a height adjustment mechanism operable to raise or lower the siping assembly.

13. The automatic machine for creating sipes of uniform depths and at uniform intervals of claim 9 wherein the length of the connecting rod is adjustable.

14. The automatic machine for creating sipes of uniform depths and at uniform intervals of claim 9 wherein the siping blade mechanism is heated.

15. The automatic machine for creating sipes of uniform depths and at uniform intervals of claim 9 wherein the tire and wheel support structure is adjustable to accommodate various wheel offsets.

* * * * *